United States Patent
Beck

[11] 3,880,644
[45] Apr. 29, 1975

[54] SULFANILAMIDE HERBICIDES
[75] Inventor: James R. Beck, Indianapolis, Ind.
[73] Assignee: Eli Lilly and Company, Indianapolis, Ind.
[22] Filed: July 13, 1973
[21] Appl. No.: 379,036

Related U.S. Application Data
[62] Division of Ser. No. 157,679, June 28, 1971, Pat. No. 3,772,277.

[52] U.S. Cl. .................. 71/88; 71/92; 71/94; 71/95; 71/103
[51] Int. Cl. .................................... A01n 9/22
[58] Field of Search .............. 71/103, 88, 92, 94, 95

[56] References Cited
UNITED STATES PATENTS
3,367,949  2/1968  Soper ...................... 71/103

Primary Examiner—Lewis Gotts
Assistant Examiner—Catherine L. Mills
Attorney, Agent, or Firm—Kathleen R. S. Page

[57] ABSTRACT
The present invention is directed to novel compounds of the formula

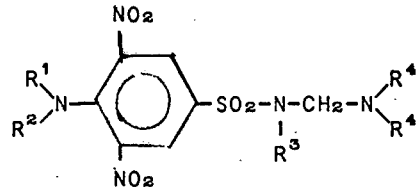

which compounds are useful as herbicides. In the above and succeeding formulae herein, $R^1$ represents hydrogen or $R^2$, and each $R^2$ independently represents loweralkyl of $C_1$-$C_4$, loweralkenyl of $C_3$-$C_4$, loweralkynyl of $C_3$-$C_4$, or radical of the formula —CH$_2$—CH$_2$(CH$_2$)$_n$Y wherein $n$ represents 0 or 1, and Y represents methoxy, cyano, bromo, or chloro, subject to the limitation that the groups represented by $R^1$ and $R^2$ together contain from 2 to 8, both inclusive, carbon atoms; $R^3$ represents hydrogen or methyl; and each $R^4$, if taken separately, represents propyl, or both $R^4$, if taken together, jointly constitute with the nitrogen atom an aziridine, pyrrolidine, piperidine, hexahydroazepine, morpholine, or piperazine ring, or such ring bearing mono- or diloweralkyl substitution of a total of not more than 3 carbon atoms.

12 Claims, No Drawings

SULFANILAMIDE HERBICIDES

CROSS REFERENCE TO RELATED APPLICATION

This is a division of my copending application Ser. No. 157,679, filed June 28, 1971 and issued Nov. 13, 1973 as U.S. Pat. No. 3,772,277.

DETAILED DESCRIPTION OF THE INVENTION

The present invention is directed to compounds of the formula

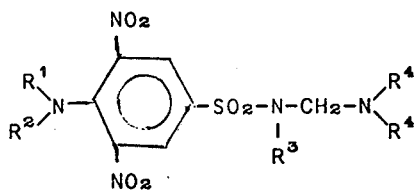

wherein $R^1$, $R^2$, $R^3$, and $R^4$ are as defined hereinabove. The compounds are typically crystalline solids. They are prepared by the Mannich reaction, using formaldehyde, a sulfanilamide compound of the formula

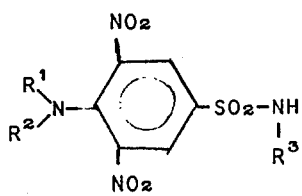

and an amine of the formula

The reaction is conducted in accordance with standard procedures for the Mannich reaction; see, e.g., Blicke, Organic Reactions (John Wiley & Sons, Inc., New York, N.Y., 1942), Vol. 1, page 303 et seq.; and Hellman and Teichmann, Berichte, Vol. 91, page 2432 et seq. In general, the sulfanilamide is mixed with the amine, and the formaldehyde added as an aqueous solution or as paraformaldehyde. A solvent, such as an alcohol, can be used but is generally unnecessary when the formaldehyde is supplied as a liquid. The reaction goes forward over a wide range of temperatures, for example, from room temperature to reflux temperatures. Separation, and if desired, purification, are carried out in conventional procedures.

The compounds of the present invention are named herein as substituted sulfanilamides, with structure and position identification as follows:

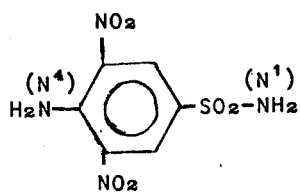

Aliphatic groups are straight-chain unless otherwise identified.

The following examples illustrate the present invention and will enable those skilled in the art to synthesize all of the compounds of the present invention.

EXAMPLE 1

$N^1$-Piperidinomethyl-3,5-dinitro-$N^4$,$N^4$-dipropylsulfanilamide 3,5-Dinitro-$N^4$,$N^4$-dipropylsulfanilamide (4.0 grams; 0.012 mole) and formaldehyde (1.0 milliliter) were dissolved in ethanol and piperidine (0.8 gram; 0.011 mole) added. The addition caused a temperature rise and precipitation of a yellow product, the desired $N^1$-piperidinomethyl-3,5-dinitro-$N^4$,$N^4$-dipropylsulfanilamide. It was separated by filtration, washed with water, and recrystallized from ethanol, m.p., 138°–40°C.

Analysis, Calc.: C, 48.75; H, 6.59; N, 15.79
Found: C, 48.04; H, 6.22; N, 15.68.

EXAMPLES 2–12:

Other representative compounds of the present invention, prepared in accordance with the foregoing teachings and examples, are the following:

$N^1$-dipropylaminomethyl-3,5-dinitro-$N^4$,$N^4$-dipropylsulfanilamide, m.p., 95°–7°C.

$N^1$-(2,5-dimethylpyrrolidinomethyl)-3,5-dinitro-$N^4$,$N^4$137°–m.p., 145°–47°C.

$N^1$-(2-ethylpiperidinomethyl)-3,5-dinitro-$N^4$,$N^4$-dipropylsulfanilamide, m.p., 130°–32°C.

$N^1$-hexahydroazepinomethyl-3,5-dinitro-$N^4$,$N^4$-dipropylsulfanilamide, m.p., 137–39°C.

$N^1$-(2,2-dimethylaziridinomethyl)-3,5-dinitro-$N^4$,$N^4$-dipropylsulfanilamide, m.p., 124°–27°C.

$N^1$-(3-methylpiperidinomethyl)-3,5-dinitro-$N^4$,$N^4$-dipropylsulfanilamide, m.p., 145°–48°C.

$N^1$-methyl-$N^1$-piperidinomethyl-3,5-dinitro-$N^4$,$N^4$-dipropylsulfanilamide, m.p., 89°–91°C.

$N^1$-morpholinomethyl-3,5-dinitro-$N^4$,$N^4$-dipropylsulfanilamide, m.p., 105°–08°C.

$N^1$-(4-methyl-1-piperazinylmethyl)-3,5-dinitro-$N^4$,$N^4$-dipropylsulfanilamide, m.p., 95°–8°C.

$N^1$-methyl-$N^1$-morpholinomethyl-3,5-dinitro-$N^4$,$N^4$-dipropylsulfanilamide, m.p., 103°–06°C.

$N^1$-(4-methylpiperidinomethyl)-3,5-dinitro-$N^4$,$N^4$-dipropylsulfanilamide, m.p., 155°–57°C.

EXAMPLES 13–22:

Yet other representative compounds illustrative of the present invention are the following:

$N^1$-(3-methylpiperidinomethyl)-3,5-dinitro-$N^4$,$N^4$-dimethylsulfanilamide.

$N^1$-methyl-$N^1$-aziridinomethyl-3,5-dinitro-$N^4$-methyl-$N^4$-butylsulfanilamide.

$N^1$-piperidinomethyl-3,5-dinitro-$N^4$,$N^4$-bis(2-methoxyethyl)-sulfanilamide.

$N^1$-morpholinomethyl-3,5-dinitro-$N^4$-isopropylsulfanilamide.

$N^1$-hexahydroazepinomethyl-3,5-dinitro-$N^4$,$N^4$-diallylsulfanilamide.

$N^1$-pyrrolidinomethyl-3,5-dinitro-$N^4,N^4$-bis(2-cyanoethyl)-sulfanilamide.

$N^1$-(1-piperazinylmethyl)-3,5-dinitro-$N^4,N^4$-dipropynylsulfanilamide.

$N^1$-aziridinomethyl-3,5-dinitro-$N^4,N^4$-bis(2-chloroethyl)-sulfanilamide.

$N^1$-(1-piperazinylmethyl)-3,5-dinitro-$N^4,N^4$-bis(3-bromopropyl)-sulfanilamide.

$N^1$-pyrrolidinomethyl-3,5-dinitro-$N^4,N^4$-dibutylsulfanilamide.

The compounds of the present invention are adapted to be employed as herbicides. The compounds can be utilized to achieve broad herbicidal action; hence, in its broadest sense, the present invention is directed to a method which comprises applying to a plant part, which can be a stem, leaf, flower, fruit, root, or seed or other similar reproductive unit of a plant, a growth-inhibiting amount of one of the compounds of the present invention. However, the compounds can also be utilized to take advantage of selective patterns of herbicidal activity.

It is not critical to the practice of the present invention that complete destruction of undesirable vegetation be obtained, it being adequate if the growth of the unwanted vegetation is merely inhibited. Especially where selective action is sought, inhibition falling short of actual killing is adequate, particularly when combined with naturally occurring conditions such as limited moisture and the like which more adversely affect the vegetation selectively inhibited than the crop plant.

The compounds of the present invention are suited to a wide variety of herbicidal applications. Thus, for example, at rates which evoke the selective action of the compounds, which rates are defined more completely hereinbelow, the compounds can be used as selective herbicides in crop plants, such as, for example cotton, corn, sorghum, soybeans, and the like. In such use, application can be made preemergent to both crops and weeds, or, preferably by means of a directed spray application technique, postemergent to the crop plant but both preemergent and postemergent to the weeds. In another application, the compounds can be used to give broad herbicidal action on non-crop land, including intermittently non-crop strips of contour-farmed land. For such usage on so-called fallow land, application can be made in spring to suppress vegetative growth until a fall or following spring planting, or in the fall to suppress vegetative growth until a spring or following fall planting. Furthermore, in another application, the present compounds can be utilized to control weeds in tree crop plantings, such as plantings of the various citrus trees. Also, the compounds can be used for turf applications. In addition to the foregoing terrestrial embodiments, the present compounds can also be utilized as aquatic herbicides.

The practice of the present invention in any of its numerous embodiments can in some instances be carried out with unmodified compound; however, for good results, it is generally necessary that the compound be employed in modified form, that is, as one component of a composition formulated to implement the plant growth-inhibiting effects. Thus, for example, the active agent can be mixed with water or other liquid or liquids, preferably aided by the usage of a surface active agent. The active agent can also be incorporated on a finely divided solid, which can be a surface active substance, to yield a wettable powder, which can subsequently be dispersed in water or other liquid, or incorporated as part of a dust which can be applied directly. Other methods of formulations are known in the art and can be employed in implementing the present invention.

In carrying out the novel method of the present invention, the exact amount of the active agent employed is not critical and will vary, depending upon the type of growth-inhibiting effect desired, the identity of the plants concerned, the particular active agent used, weather conditions, and the like. In general, a broad growth-inhibiting effect is obtained with rates of from about 8 to 20 pounds or more of active agent per acre, and such rates are suitable and effective for control of vegetative growth on fallow land. When it is desired to obtain a selective growth-inhibiting effect on weeds in areas containing crop plants such as corn, soybeans, and cotton, rates of from 0.25 to about 8 pounds generally give good results. When in the typical mode of operation, the active agent is employed as a composition comprising the agent, the exact concentration of active agent in the composition is not critical, except that the concentration and total amount of formulation employed be adequate to supply the appropriate amount of active agent on a per acre basis. In general, good results are obtained when employing formulations containing the active agent in a concentration of from 0.5 to 10 percent or higher, in the instance of a liquid formulation; and in a concentration of from 1.0 to 5.0 percent or higher, in the instance of a dust, powder, granule, or the like. More concentrated formulations can be prepared and are often preferred in that they can serve, depending upon the particular application contemplated and the particular concentration, both as a concentrated formulation for purposes of shipment, storage, and the like, and as an ultimate treating composition. Thus, for example, formulations often preferably contain a surface active agent and the present active agent, the latter being present in an amount of from 0.5 to 99.5 percent, by weight; or an inert, finely divided solid and the present active agent, the latter being present in an amount of from 1.0 to 99.0 percent, by weight. Such formulations, as indicated, can be employed directly in certain applications, but can also be diluted and subsequently employed in many other applications.

Liquid compositions containing the desired amount of active agent are prepared by dissolving the substance in a liquid, with or without the aid of a surface active dispersing agent such as an ionic or non-ionic emulsifying agent. Suitable liquids include agricultural spray oils and the petroleum distillates such as diesel fuel, kerosene, fuel oil naphthas and Stoddard solvent. The choice of dispersing and emulsifying agent and the amount thereof employed is dictated by the nature of the composition and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyalkylene derivatives or sorbitan esters, complex ether alcohols, and the like. Representative surface active agents which are suitably employed in implementing the present invention are identified in U.S. Pat. Nos. 3,095,229, second column, lines 25–36, 2,655,447, column 5, and 2,412,510, columns 4 and 5.

In the preparation of dust compositions, the active ingredient is intimately dispersed in and on a finely divided solid such as clay, talc, chalk, gypsum, limestone, vermiculite fines, perlite, and the like. In one method of achieving such dispersion, the finely divided carrier is mechanically mixed or ground with the active agent.

Similarly, dust compositions containing the toxicant compounds can be prepared with various of the solid surface active dispersing agents such as bentonite, fuller's earth, attapulgite and other clays. Depending upon the proportions of ingredients, these dust compositions can be employed as concentrates and subsequently diluted with additional solid surface active dispersing agents or with chalk, talc, or gypsum and the like to obtain the desired amount of active ingredient in a composition adapted to be employed for the suppression of the growth of the plants. Also, such dust compositions can be dispersed in water, with or without the aid of a dispersing agent, to form spray mixtures.

Formulations containing the present active agent are often advantageously further modified by incorporation therein of an effective amount of a surfactant which facilitates the dispersion and spreading of the formulation on the plant leaf surfaces and the incorporation of the formulation by the plant.

In accordance with the present invention, the active agent can be dispersed in soil or other growth media in any convenient fashion. Applications can be carried out by simply mixing with the media, by applying to the surface of soil and thereafter dragging or discing into the soil to the desired depth, or by employing a liquid carrier to accomplish the penetration and impregnation. The application of spray and dust compositions to the surface of soil, or to plant parts or the above ground surfaces of plants can be carried out by conventional methods, e.g., power dusters, boom and hand sprayers and spray dusters, whether surface or air-borne.

In a further method, the distribution of the active agent in soil can be accomplished by introducing the agent into the water employed to irrigate the soil. In such procedures, the amount of water is varied with the porosity and water holding capacity of the soil to obtain a desired depth of distribution of the agent.

In addition, the present method also comprehends the employment of an aerosol composition containing one or more of the present active agents as an active compound. Such a composition is prepared according to conventional methods wherein the agent is dispersed in a solvent, and the resultant dispersion mixed with a propellant in liquid state. Such variables as the particular agent to be used and the nature of the vegetation which is to be treated will determine the desirability of the solvent and concentration of the agent therein.

EXAMPLE 23:

The formulation of the compounds of the present invention for the purpose of conducting the herbicidal evaluation, the results of which are reported hereinbelow, was carried out in accordance with conventional procedures. The compound to be evaluated was initially suspended in a 1:1 acetone/ethanol solution of a blend of nonionic sulfonate emulsifying agents. The suspension was then diluted with an aqueous solution of the same blend of agents to obtain the ultimate treating composition; this composition contained 4.15 percent of each of the acetone and ethanol, 1000 ppm. of the blend of emulsifying agents, and the respective compounds in an amount to supply the desired pounds per acre. In the instance of some of the lower rates, a formulation so obtained was further diluted with water containing 1000 ppm. of the blend of emulsifying agents, only, thus further lessening the concentration of the ethanol and acetone.

EXAMPLES 24–35:

Various of the compounds of the present invention were evaluated for preemergent application to various species of plants. In this evaluation, a soil was prepared consisting of one part masonry sand and one part shredded top soil blended together in a cement mixer. One gallon of this soil was placed in a 21.5 × 31.5 cm. galvanized flat and was patted down with a bench brush until level. A three-row marker was used to make 2 ½ cm. deep furrows in approximately two-fifths of the flat. Crop seeds consisting of four kernels of corn, five cotton seeds and five soybean seeds were placed in these furrows. A four-row template was then placed on the remaining soil and the indicated approximate numbers of each of the following seeds were planted, one species to each section: foxtail (millet), 80–100 seeds; velvetleaf (40–50 seeds); rough pigweed (150–250 seeds); and large crabgrass (100–150 seeds).

Sufficient soil was added to cover the entire flat. Thus, the weed seeds were covered to a depth of about 6 mm. and the crop seeds were covered to a depth of about 3 cm.

In assaying the effect of the composition as preemergent herbicides, a flat prepared as above, taken either on the day of planting or on the next day, was placed in a chamber equipped with a turntable and an air exhaust. A herbicidal composition containing the subject compound and prepared as described in the preceding example was applied to the flat with a modified DeVilbiss atomizer hooked to an air source. Twelve and one-half milliliters of the composition under test were applied to each flat either on the day of planting or the succeeding day. Injury ratings and observations as to type of injury were made 11 to 12 days after treatment. The injury rating scale used was as follows:

0—no injury
1—slight injury
2—moderate injury
3—severe injury
4—death

When more than one determination was carried out at a given rate, an average value was calculated for the injury rating.

In the following table setting forth the results of the evaluation, column 1 gives the name of the compound under test; column 2, the rate in pounds per acre at which the compound was applied to the test flat; and the remaining columns, the injury to the particular plant seeds or seedlings as measured by the foregoing scale.

TABLE I

| Compound | Lbs./Acre | Corn | Cotton | Soybean | Crabgrass | Pigweed | Foxtail | Velvet-Leaf |
|---|---|---|---|---|---|---|---|---|
| $N^1$-Dipropylaminomethyl-3,5-dinitro-$N^4$,$N^4$-dipropylsulfanilamide | 8 | 2 | 2 | 3 | 4 | 4 | 4 | — |
|  | 4 | 0 | 0 | 0 | 3 | 3 | 3 | — |
|  | 2 | 0 | 0 | 0 | 3 | 3 | 3 | — |
| $N^1$-(2,5-Dimethylpyrrolidinomethyl)-3,5-dinitro-$N^4$,$N^4$-dipropylsulfanilamide | 8 | 2 | 1 | 2 | 4 | 4 | 3 | — |
|  | 4 | 0 | 0 | 0 | 3 | 4 | 3 | 3 |
|  | 2 | 1 | 0 | 0.5 | 3.5 | 2.5 | 3 | 2.5 |
| $N^1$-(2-Ethylpiperidinomethyl)-3,5-dinitro-$N^4$,$N^4$-dipropylsulfanilamide | 8 | 1 | 3 | 3 | 4 | 4 | 4 | — |
|  | 4 | 0 | 0 | 0 | 3 | 2 | 3 | 2 |
|  | 2 | 0.5 | 0 | 1 | 3.5 | 2.5 | 2.5 | 2 |
| $N^1$-Hexahydroazepinomethyl-3,5-dinitro-$N^4$,$N^4$-dipropylsulfanilamide | 8 | 0 | 1 | 2 | 4 | 4 | 3 | 3 |
|  | 4 | 2 | 1 | — | 3 | 4 | 4 | 3 |
|  | 2 | 0.5 | 1 | 0 | 3.5 | 3 | 3 | 1.5 |
| $N^1$-(2,2-Dimethylaziridinomethyl)-3,5-dinitro-$N^4$,$N^4$-dipropylsulfanilamide | 8 | 1 | 1 | 1 | 3 | 3 | 3 | 3 |
|  | 4 | 2 | 1 | 2 | 4 | 2 | 3 | 2 |
| $N^1$-(3-Methylpiperidinomethyl)-3,5-dinitro-$N^4$,$N^4$-dipropylsulfanilamide | 8 | 0 | 0 | 2 | 3 | 4 | 3 | 3 |
|  | 4 | 1 | 0 | 2 | 4 | 3 | 3 | 2 |
| $N^1$-Piperidinomethyl-3,5-dinitro-$N^4$,$N^4$-dipropylsulfanilamide | 8 | 1 | 2 | 3 | 4 | 4 | 3 | — |
|  | 4 | 3 | 2 | 3 | 4 | 3 | 4 | — |
|  | 2 | 0.5 | 1 | 1 | 4 | 3 | 3 | — |
|  | 1 | 0.3 | 0.3 | 0.7 | 3 | 2.7 | 3 | 1 |
|  | 1/2 | 0 | 0 | 0 | 2.5 | 2 | 2.5 | 1 |
| $N^1$-Methyl-$N^1$-piperidinomethyl-3,5-dinitro-$N^4$,$N^4$-dipropylsulfanilamide | 8 | 0 | 0 | 0 | 3 | 2 | 3 | — |
|  | 4 | 0 | 0 | 0 | 3 | 1 | 3 | — |
|  | 2 | 0 | 0 | 0 | 3 | 1.5 | 2.5 | — |
| $N^1$-Morpholinomethyl-3,5-dinitro-$N^4$,$N^4$-dipropylsulfanilamide | 8 | 1 | 2 | 1 | 4 | 4 | 3 | — |
|  | 4 | 2 | 2 | 2 | 4 | 3 | 4 | — |
|  | 2 | 2 | 0 | 0 | 4 | 2 | 3 | — |
| $N^1$-(4-Methyl-1-piperazinylmethyl)-3,5-dinitro-$N^4$,$N^4$-dipropysulfanilamide | 8 | 2 | 0 | 2 | 4 | 4 | 4 | — |
|  | 4 | 2 | 2 | 1 | 4 | 3 | 3 | — |
|  | 2 | 0.5 | 1 | 1 | 3 | 2.5 | 2.5 | — |
| $N^1$-Methyl-$N^1$morpholinomethyl-3,5-dinitro-$N^4$,$N^4$-dipropylsulfanimide | 8 | 1 | 0 | 0 | 4 | 3 | 3 | — |
|  | 4 | 0 | 0 | 1 | 4 | 2 | 3 | — |
|  | 2 | 0 | 0 | 1 | 3 | 2 | 3 | — |
| $N^1$-(4-Methylpiperidinomethyl)-3,5-dinitro-$N^4$,$N^4$-dipropylsulfanilamide | 8 | 0 | — | — | 3 | 3 | 3 | 3 |
|  | 4 | 2 | 1 | 2 | 3 | 4 | 3 | 3 |
|  | 2 | 0.5 | 0 | 0 | 3.5 | 2.5 | 3.5 | 3 |

EXAMPLES 36–45

Essentially the same results as those reported in foregoing Examples 24–35 are obtained when evaluating the following other representative compounds of the present invention.

$N^1$-(3-methylpiperidinomethyl)-3,5-dinitro-$N^4$,$N^4$-dimethylsulfanilamide.

$N^1$-methyl-$N^1$-aziridinomethyl-3,5-dinitro-$N^4$-methyl-$N^4$-butylsulfanilamide.

$N^1$-piperidinomethyl-3,5-dinitro-$N^4$,-$N^4$-bis(2-methoxyethyl)-sulfanilamide.

$N^1$-morpholinomethyl-3,5-dinitro-$N^4$-isopropylsulfanilamide.

$N^1$-hexahydroazepinomethyl-3,5-dinitro-$N^4$,$N^4$-diallylsulfanilamide.

$N^1$-pyrrolidinomethyl-3,5-dinitro-$N^4$,$N^4$-bis(2-cyanoethyl)-sulfanilamide.

$N^1$-(1-piperazinylmethyl)-3,5-dinitro-$N^4$,$N^4$-dipropynylsulfanilamide.

$N^1$-aziridinomethyl-3,5-dinitro-$N^4$,$N^4$-bis(2-chloroethyl)-sulfanilamide.

$N^1$-(1-piperazinylmethyl)-3,5-dinitro-$N^4$,$N^4$-bis(3-bromopropyl)sulfanilamide.

$N^1$-pyrrolidinomethyl-3,5-dinitro-$N^4$,$N^4$-dibutylsulfanilamide.

Satisfactory results are obtained when the active agent of the present invention, or a composition comprising such active agent, is combined with other agricultural materials intended to be applied to plants, plant parts, or their habitats. Such materials include fertilizers, fungicides, nematocides, insecticides, other herbicides, soil conditioning agents, and the like.

I claim:

1. The method suitable for effecting plant growth inhibition which comprises applying to a plant part a growth-inhibiting amount of an active agent, said active agent being a compound of the formula

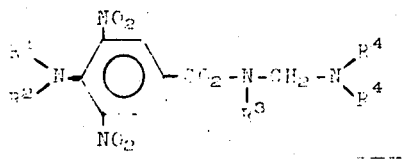

wherein $R^1$ represents hydrogen or $R^2$, and each $R^2$ independently represents loweralkyl of $C_1$–$C_4$, loweralkenyl of $C_3$–$C_4$, loweralkynyl of $C_3$–$C_4$, or radical of the formula —$CH_2$—$CH_2$—$(CH_2)_n$Y wherein $n$ represents 0 or 1, and Y represents methoxy, cyano, bromo, or chloro, subject to the limitation that the groups represented by $R^1$ and $R^2$ together contain from 2 to 8, both inclusive, carbon atoms; $R^3$ represents hydrogen or methyl; and each $R^4$, if taken separately, represents propyl, or both $R^4$, if taken together, jointly constitute with the nitrogen atom an aziridine, pyrrolidine, piperidine, hexahydroazepine, morpholine, or piperazine ring, or such ring bearing mono- or diloweralkyl substitution of a total of not more than 3 carbon atoms.

2. The method of claim 1 wherein the active agent is $N^1$-piperidinomethyl-3,5-dinitro-$N^4$,$N^4$-dipropylsulfanilamide.

3. The method of claim 1 wherein the active agent is $N^1$-(2,5-dimethylpyrrolidinomethyl)-3,5-dinitro-$N^4$,$N^4$-dipropylsulfanilamide.

4. The method of claim 1 wherein the active agent is N¹-methyl-N¹-piperidinomethyl-3,5-dinitro-N⁴,N⁴-dipropylsulfanilamide.

5. The method of claim 1 wherein the active agent is N¹-(2-ethylpiperidinomethyl)-3,5-dinitro-N⁴,N⁴-dipropylsulfanilamide.

6. The method of claim 1 wherein the active agent is N¹-hexahydroazepinomethyl-3,5-dinitro-N⁴,N⁴-dipropylsulfanilamide.

7. The composition suitable for effecting plant growth inhibition which comprises a surface active agnet and a plant growth inhibiting amount of an active agent, said active agent being a compound of the formula

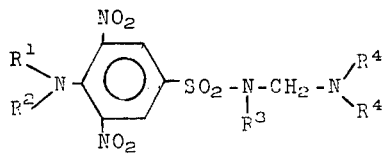

wherein R¹ represents hydrogen or R², and each R² independently represents loweralkyl of C₁–C₄, loweralkenyl of C₃–C₄, loweralkynyl of C₃–C₄, or radical of the formula —CH₂—CH₂—CH₂)ₙY wherein n represents 0 or 1, and Y represents methoxy, cyano, bromo, or chloro, subject to the limitation that the groups represented by R¹ and R² together contain from 2 to 8, both inclusive, carbon atoms; R³ represents hydrogen or methyl; and each R⁴, if taken separately, represents propyl, or both R⁴, if taken together, jointly constitute with the nitrogen atom an aziridine, pyrrolidine, piperidine, hexahydroazepine, morpholine, or piperazine ring, or such ring bearing mono- or diloweralkyl substitution of a total of not more than 3 carbon atoms.

8. The composition of claim 7 wherein the active agent is N¹-piperidinomethyl-3,5-dinitro-N⁴,N⁴-dipropylsulfanilamide.

9. The composition of claim 7 wherein the active agent is N¹-(2,5-dimethylpyrrolidinomethyl)-3,5-dinitro-N⁴,N⁴-dipropylsulfanilamide.

10. The composition of claim 7 wherein the active agent is N¹-methyl-N¹-piperidinomethyl-3,5-dinitro-N⁴,N⁴-dipropylsulfanilamide.

11. The composition of claim 7 wherein the active agent is N¹-(2-ethylpiperidinomethyl)-3,5-dinitro-N⁴,N⁴-dipropylsulfanilamide.

12. The composition of claim 7 wherein the active agent is N¹-hexahydroazepinomethyl-3,5-dinitro-N⁴,N⁴-dipropylsulfanilamide.

* * * * *